US010437239B2

(12) United States Patent
Bowman et al.

(10) Patent No.: US 10,437,239 B2
(45) Date of Patent: Oct. 8, 2019

(54) OPERATION SERIALIZATION IN A PARALLEL WORKFLOW ENVIRONMENT

(71) Applicant: Brigham Young University, Provo, UT (US)

(72) Inventors: K Eric Bowman, Provo, UT (US); Joshua Coburn, Orem, UT (US); C. Greg Jensen, Provo, UT (US)

(73) Assignee: Brigham Young University, Provo, UT (US)

( * ) Notice: Subject to any disclaimer, the term of this patent is extended or adjusted under 35 U.S.C. 154(b) by 171 days.

(21) Appl. No.: 15/621,929

(22) Filed: Jun. 13, 2017

(65) Prior Publication Data

US 2017/0357251 A1   Dec. 14, 2017

Related U.S. Application Data

(60) Provisional application No. 62/349,433, filed on Jun. 13, 2016.

(51) Int. Cl.
*G05B 19/418* (2006.01)
*G06F 9/50* (2006.01)
*G06F 17/50* (2006.01)
*H04L 29/06* (2006.01)

(52) U.S. Cl.
CPC . *G05B 19/41865* (2013.01); *G05B 19/41885* (2013.01); *G06F 9/505* (2013.01)

(58) Field of Classification Search
USPC ................. 709/203, 204, 206, 223, 229
See application file for complete search history.

(56) References Cited

U.S. PATENT DOCUMENTS

| 5,819,087 | A  | * | 10/1998 | Le ........................ G06F 9/4401 713/2 |
| 7,020,697 | B1 | * | 3/2006  | Goodman .............. G06Q 10/10 709/223 |
| 7,747,673 | B1 | * | 6/2010  | Simone, Jr. .......... G06F 9/4494 709/201 |
| 7,853,833 | B1 | * | 12/2010 | Gharbia ............. G06F 11/0709 709/224 |
| 9,432,298 | B1 | * | 8/2016  | Smith ................ H04L 49/9057 |
| 10,083,052 | B1 | * | 9/2018 | Venkatraman ........... G06F 8/61 |
| 2009/0094252 | A1 | * | 4/2009 | Wong .................... H04L 67/06 |
| 2012/0317497 | A1 | * | 12/2012 | Red ........................ G06F 17/50 715/751 |

(Continued)

Primary Examiner — Jude Jean Gilles
(74) Attorney, Agent, or Firm — Kunzler Bean & Adamson

(57) ABSTRACT

A method for multi-user CAx editing includes monitoring an operational state of a processor of a first CAx client, receiving, at a communication filter of the first CAx client, a first remote operation to be executed by the first CAx client in a CAx environment, populating the first remote operation to a queue formed in a memory structure in response to a determination that the operational state of the processor of the first CAx client is executing a local operation when the first remote operation is received, and executing the first remote operation in the CAx environment on the first CAx client in response to a determination that the operational state of the processor of the first CAx client is idle. A computer program product such as a computer readable medium and a computer system corresponding to the above method are also disclosed herein.

20 Claims, 4 Drawing Sheets

(56) References Cited

U.S. PATENT DOCUMENTS

| | | | |
|---|---|---|---|
| 2013/0300633 A1* | 11/2013 | Horio | G06F 3/1454 345/2.2 |
| 2015/0120252 A1* | 4/2015 | Hepworth | G06F 17/50 703/1 |
| 2015/0281699 A1* | 10/2015 | Miyamoto | H04N 19/503 375/240.02 |
| 2017/0024447 A1* | 1/2017 | Bowman, Jr. | G06Q 10/101 |

* cited by examiner

OPERATION SERIALIZATION IN A PARALLEL WORKFLOW ENVIRONMENT

RELATED APPLICATIONS

This application claims priority to U.S. provisional application 62/349,433 entitled "Operation serialization in a parallel workflow environment" and filed on 13 Jun. 2016. The above application is incorporated herein by reference in its entirety.

BACKGROUND OF THE INVENTION

The claimed invention relates to computer aided technologies (CAx) such as computer aided design, engineering, analysis and manufacture in general, and managing operations from multiple CAx clients in particular.

Multi-user CAx technologies enable multiple users to collaborate on projects. However, with multiple CAx clients collaborating on a single project, operation execution orders can become intermixed and result in errors or failures.

SUMMARY OF THE INVENTION

The present invention has been developed in response to the present state of the art, and in particular, in response to the problems and needs in the art that have not yet been fully solved by currently available CAX systems, apparatuses, and methods. Accordingly, the claimed inventions have been developed to provide data protection systems, apparatuses, and methods that overcome shortcomings in the art.

A method for multi-user CAx editing includes monitoring an operation state of a processor of a first CAx client. The method also includes receiving, at a communication filter of the first CAx client, a first remote operation to be executed by the first CAx client in a CAx environment. The method also includes populating the first remote operation to a queue formed in a memory structure in response to a determination that the operational state of the processor of the first CAx client is executing a local operation when the first remote operation is received. The method also includes executing the first remote operation in the CAx environment on the first CAx client in response to determination that the operational state of the processor of the first CAx client is idle.

A computer program product including a computer readable storage medium having program instructions embodiment therewith. The program instructions are readable/executable by a processor to cause the processor to monitor an operational state of a first CAx client. The program instructions are readable/executable by the process to cause the processor to further receive, at the first CAx client, a first remote operation to be executed by the first CAx client in a CAx environment. The program instructions are readable/executable by the process to cause the processor to further populate the first remote operation to a queue formed in a memory structure in response to a determination that the operational state of the processor of the first CAx client is executing a local operation when the first remote operation is received. The program instructions are readable/executable by the process to cause the processor to further execute the first remote operation in the CAx environment on the first CAx client in response to a determination that the operational state of the processor of the first CAx client is idle.

It should be noted that references throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
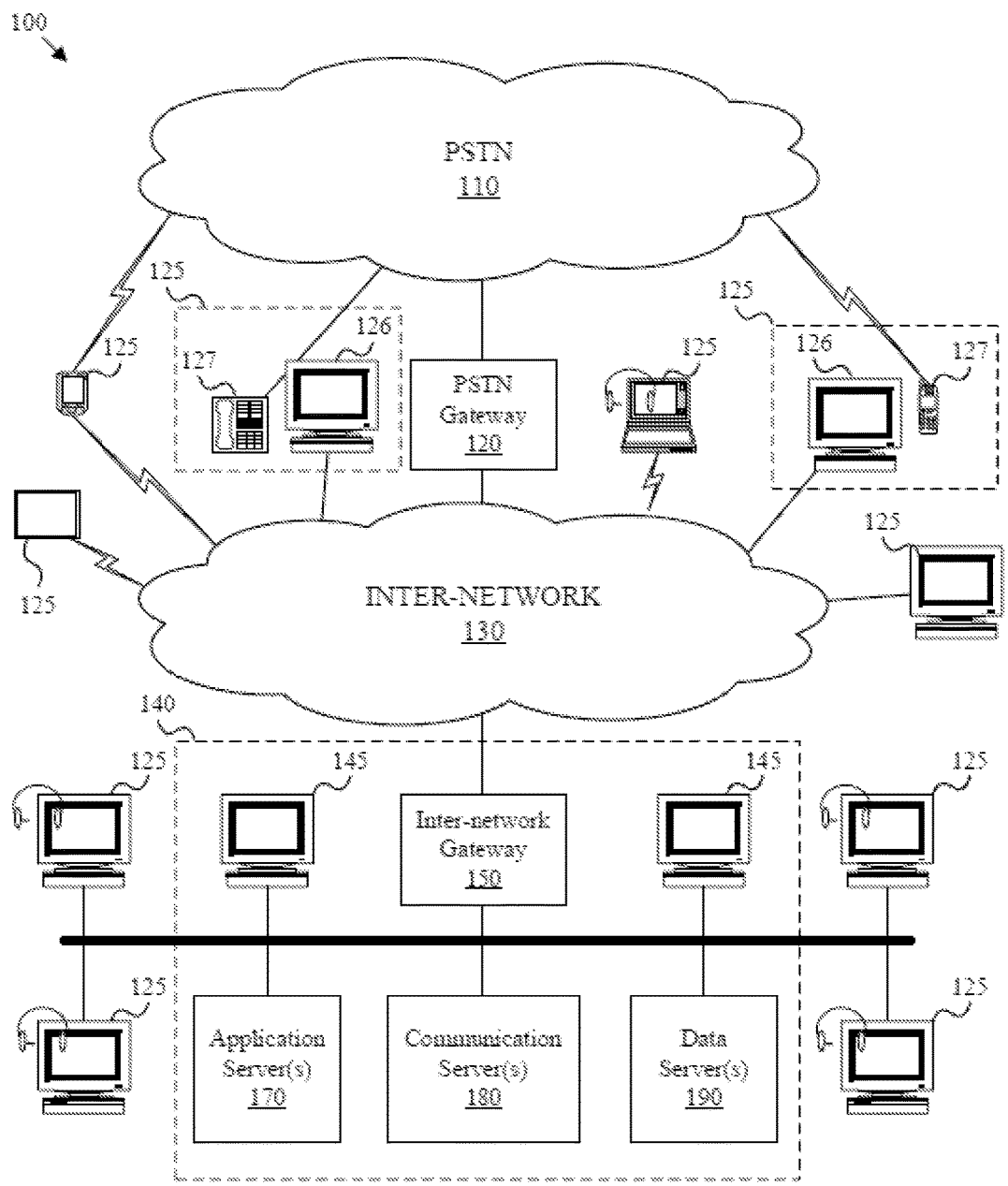
FIG. 1 is a block diagram of one example of a computing and communications infrastructure that is consistent with one or more embodiments of the claimed invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server, and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions which identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server, and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely, parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed, and executed using a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed, and executed through either a remote-access or a site-to-site VPN. When using the remote-access VPNs the computer program product is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed, and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

In a multi-user environment, it is desirable to assign different areas, regions or geometries for different users to work i.e. a workspace. The assigned workspace may or may not be a contiguous region. Casually updating the model for each user may not be effective, because it is likely a user will accidently cross into another user's workspace or create conflicts with simultaneously executed operations. The result may end up creating chaos and result in a less productive or unworkable multi-user environment. Therefore, it is generally desirable that operations be serialized as they are exchanged between users or servers.

As used herein the phrase 'engineering object' refers to an electronically modeled object that may be edited by a CAx application or tool and 'CAx model' refers to the electronic model for that object. CAx applications and tools include, but are not limited to, design tools, meshing tools, simulation tools, visualization tools, analysis tools, manufacture planning tools, and manufacture simulation tools.

FIG. 1 is a block diagram of one example of a computing and communications infrastructure 100 that is consistent with one or more embodiments of the claimed invention. As depicted, the infrastructure 100 includes various systems, subsystems, and networks such as a public switched telephone network (PSTN) 110, a TDM gateway 120 connecting the PSTN to an inter-network 130, a variety of workstations 125, a data center 140 with administrative terminals 145, an inter-network gateway 150 connecting a local area network to the inter-network 130, and various servers such as application servers 170, communication servers 180, and data servers 190. The infrastructure 100 is one example of components that can be operably interconnected to provide an infrastructure for a collaborative CAx system.

Each workstation 125 may include a separate computing device 126 and a communications device 127 or the computing device and communications device may be integrated into the workstation 125. Examples of the communications device 127 include a phone, a VOIP device, an instant messaging device, a texting device, a browsing device, and the like. The computing devices 126 may enable graphical view selection. The communications devices 127 may enable users to communicate with other CAx system users.

The inter-network 130 may facilitate electronic communications between the various workstations and servers. In one embodiment, the inter-network 130 is the internet. In another embodiment, the inter-network 130 is a virtual private network (VPN).

Various servers such as blade servers within the data center 140 function cooperatively to facilitate concurrent collaborative editing of CAx models by local and remote users. For example, the application servers 170 may provide one or more CAx applications to the local and remote users. Some users may have the CAx applications installed on their local computing devices 126.

In some embodiments, the communication servers 180 facilitate communications between the users through various channels or services such as VOIP services, email services, instant messaging services, short message services, and text messaging services. The workstations 125 may leverage such services for user to user communications via the communication servers 180 or via other available service platforms.

The data servers 190 or the like may store CAx models of design or engineering objects within various model files or records. The data servers may replicate copies of the models for use by various users. Some users may have a local copy of a model.

Figure 2:
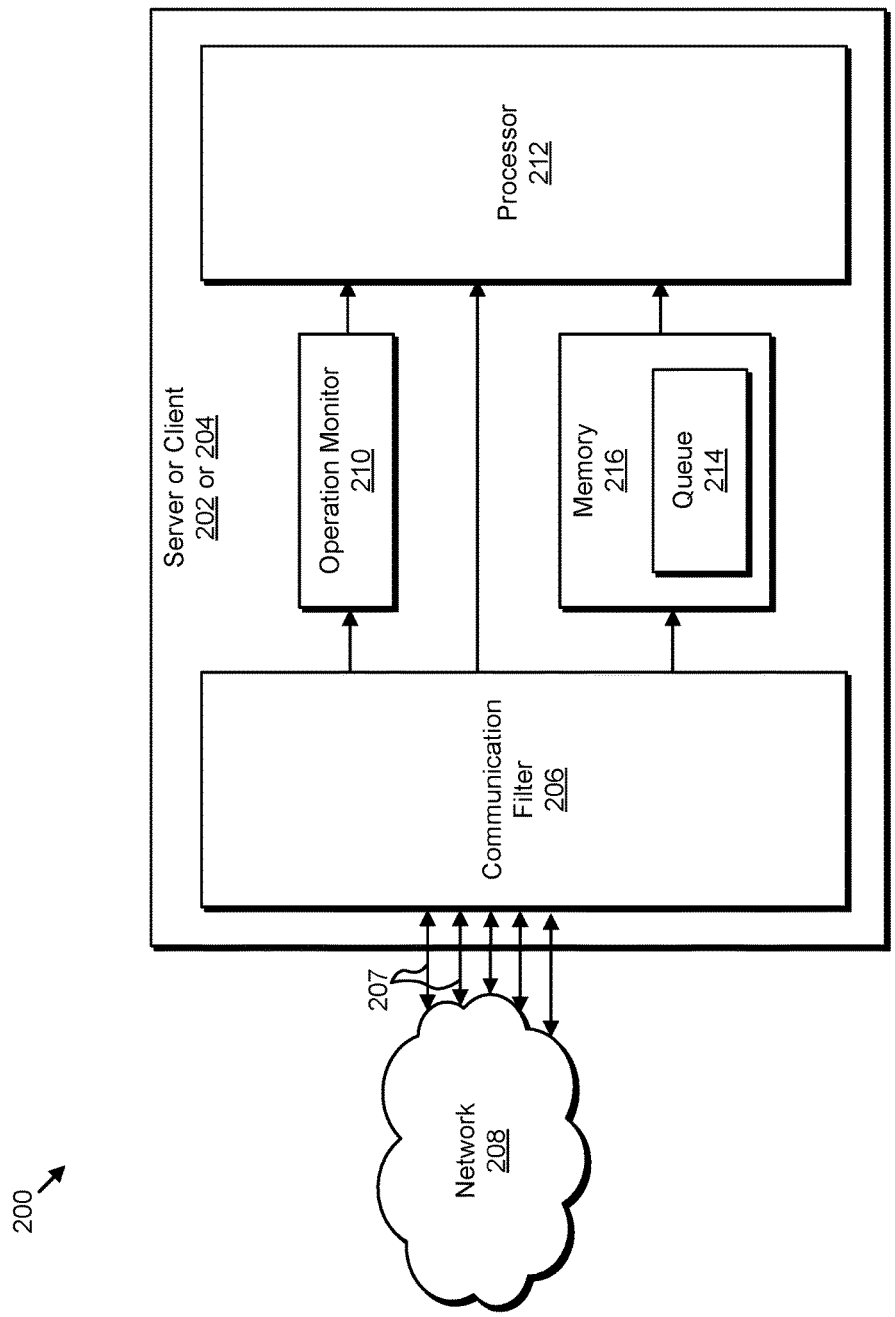
FIG. 2 is a block diagram of one example of a collaborative CAx editing system that is consistent with one or more embodiments of the claimed invention.

FIG. 2 is a block diagram of one example of a collaborative CAx editing system 200 that is consistent with one or more embodiments of the claimed invention. The illustrated embodiment includes a server or client 202 or 204, respectively. In some embodiments, the collaborative CAx editing system 200 is embodied at the server level or at the client level. The description below refers to the client 204, however, it should be borne in mind that other embodiments operate on the server 202.

In the illustrated embodiment, the client 204 includes a communication filter 206. The communication filter 206 receives communications 207 from the network 208. In some embodiments, the communications 207 are remote communications from a server or remote client distinct from the client 204. In some embodiments, the communications 207 include one or more remote operations corresponding to a CAx model or object associated with the client 204 and a remote entity. In some embodiments, the communications 207 correspond to operations to be executed on the client 204 to update the engineering object or CAx model based on operations completed relative to the CAx model separate from the client 204. In some embodiments, the communications 207 are asynchronous communications.

In some embodiments, the communications 207 may be delayed by network traffic or latencies. In other embodiments, the communications 207 may be asynchronous based on one or more network security protocols or certification or proofing processes. Other embodiments of the communications 207 may be asynchronous for other reasons or in response to other functions or processes.

In the illustrated embodiment, the communications 207 are received by the communication filter 206. In some embodiments, the communication filter 206 receives the communications 207 from a network interface device such as a network interface card or other communication component. In some embodiments, the communication filter 206 is a dedicated hardware element of the client 204. In other embodiments, the communication filter 206 includes at least one software component such as logic or a learning machine to evaluate the communications 207.

In some embodiments, the communication filter 206 analyzes the communications 207 to determine the nature of the communications 207. In some embodiments, the communication filter 206 checks to determine if the communications 207 include one or more remote operations. In some embodiments, the communication filter 206 identifies a remote operation from the communications 207 and flags the remote operation as such.

In some embodiments, the communication filter 206 is coupled to an operation monitor 210. In some embodiments, the operation monitor 210 monitors an operational state of the processor 212. In some embodiments, the operation monitor 210 determines an operational state of the processor 212 based on one or more characteristics of the processor 212. For example, the operation monitor 210 may determine the operational state of the processor 212 based on a power consumption metric, a traffic metric, a cycle metric, or a combination of these or other metrics corresponding to the activity of the processor 212.

In some embodiments, the operation monitor 210 communicates the operational state of the processor 212 to the communication filter 206. In some embodiments, in response to an indication from the operation monitor 210 that the processor 212 is in an executing local operations state, the communication filter 206 directs communications 207 determined to be remote operations to a queue 214 in a memory 216.

In some embodiments, the memory 216 is a memory device corresponding to the client 204. In other embodiments, the memory 216 is a memory device separate from the client 204. For example, the memory 216 may include a memory device corresponding to a server, another client, a network attached storage, a cloud memory device, or other memory device.

In the illustrated embodiment, the memory 216 includes the queue 214. In some embodiments, the queue 214 prioritizes remote operations based on the time they are received from the communication filter 206. In other embodiments, the queue 214 sorts the remote operations received from the communication filter 206 based on an operation's priority level, file size, or one or more other criteria.

In some embodiments, one or more remote operations are stored to the queue 214 in response to a determination that the processor 212 is executing a local operation associated with the client 204. In some embodiments, the queue 214 provides the one or more remote operations to the processor for execution in response to a determination that the operational state of the processor 212 is idle.

In some embodiments, the communication filter 206 receives an indication from the operation monitor 210 signaling that the processor 212 is no longer executing a local operation and is available to execute a remote operation. In some embodiments, the communication filter 206 causes the remote operation to be sent from the queue 214 to the processor 212.

In other embodiments, the operation monitor 210 communicates directly with the queue 214 or the memory 216 to send remote operations from the queue 214 to the processor 212. In some embodiments, the remote operations are sent directly from the queue 214 to the processor 212. In other embodiments, the remote operations are sent indirectly from the queue 214 to the processor 212 for execution. For example, the remote operations may be sent from the queue 214 to the communication filter 206 to be sent to the processor 212 or the remote operation may be sent from the queue 214 in memory 216 to another location in the memory 216 for execution by the processor 212. In some embodiments, the remote operation 214 is read directly from the memory 216 without needing to be moved, copied, or transferred. For example, in response to a determination that the processor 212 is idle, the operation monitor 210 may send a command to the processor 212 to execute the first remote operation in the queue 214.

In some embodiments, the queue 214 stores a pointer associated with a storage location of the remote operation in the memory 216. In some embodiments, the pointer serves as a reference for the operation monitor 210 in response to a determination that the processor 212 has entered an idle operational state. In other embodiments, the pointer may be called or provided to the processor 212 by another component of the client 204 in response to a determination that the processor 212 has entered an idle state of operation.

Figure 3:
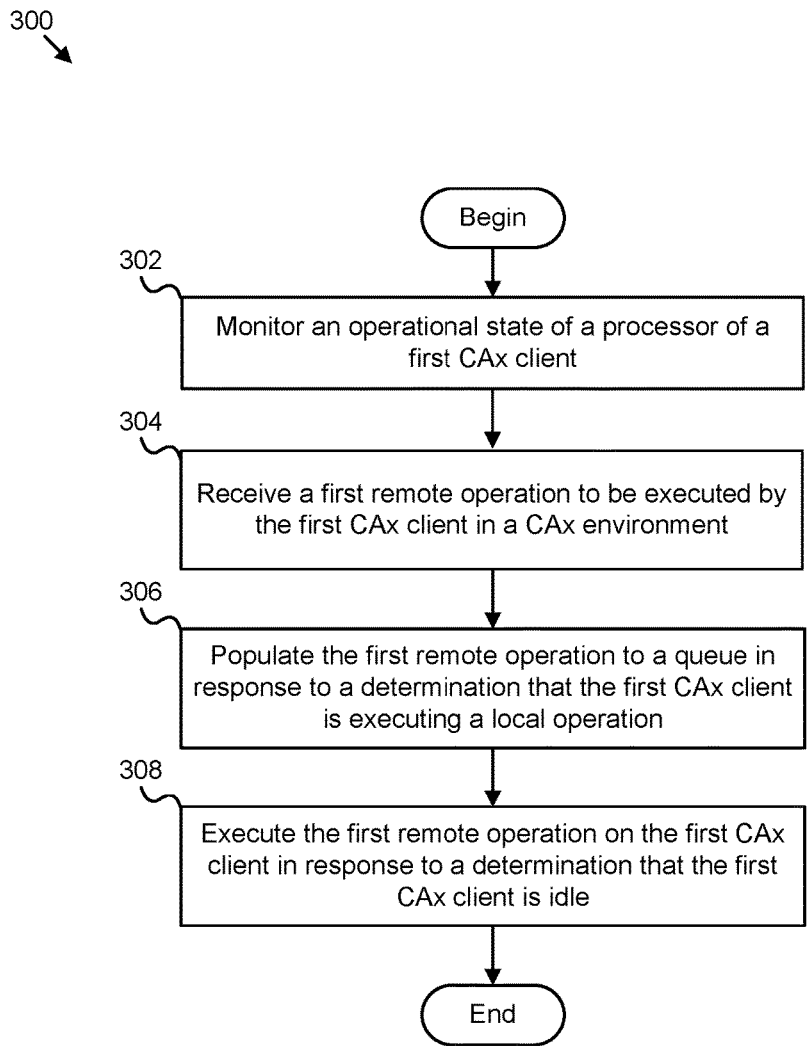
FIG. 3 is a flowchart diagram of one embodiment of a method for multi-user CAx editing.

FIG. 3 is a flowchart diagram of one embodiment of a method 300 for multi-user CAx editing. At block 302, the illustrated method 300 includes monitoring an operational state of a processor of a first CAx client. In some embodiments, the operational state of the processor is monitored by performing periodic checks of the operational state of the processor of the first CAx client based on a check schedule. In other embodiments, a change in the operational state of the processor triggers a notification.

At block 304, the method 300 includes receiving a first remote operation to be executed by the first CAx client in a CAx environment. In some embodiments, the first remote operation is received by a communication filter. In some embodiments, the CAx environment is a cooperative environment operating on one or more clients. In some embodiments, the remote operation includes updates to one or more features of a CAx model on the CAx client.

Examples of features include the shape, dimensions, composition, material properties and tolerances of an object, the mesh size and required accuracy for simulations, the path and tolerances for a manufacturing tool, and any other attribute that may affect the performance of a product and the manufacture thereof.

In some embodiments, the CAx client includes a local model datastore that contains local copies of CAx models managed by a global model datastore. In some embodiments, the local and global model datastores coordinate together to provide data coherency between local copies of the CAx models and the global copy. In some embodiments, the global model datastore is a redundant and/or a distributed storage system. In some embodiments, the local copies of the CAx models exchange data with one another to provide data coherency.

In some embodiments, the CAx client includes a user interface. In some embodiments, the user interface indicates reception of the first remote operation to by executed by the first CAx client in the CAx environment. In some embodiments, the user interface does not provide an indication of the first remote operation until the first remote operation is executed on the CAx client, as described below. In other embodiments, the user interface does not display the remote operation on the CAx client.

In some embodiments, the user interface displays a level of detail regarding the pending remote operation to be executed by the first CAx client. In some embodiments, the level of detail shown by the user interface is user customizable. In some embodiments, the user interface allows for customization of the level of detail shown.

In some embodiments, the user interface provides a user with a variety of interface elements that facilitate concurrent collaborative editing. Examples of such interface elements include interfaces elements for displaying a feature tree, defining a partitioning surface or equation, selecting, reserving, assigning, locking and releasing geometries, editing regions and features, specifying a feature constraint, selecting and editing geometries, displaying a list of concurrent users, displaying user identifiers proximate to assigned editing regions, presenting a list or other view of geometries and/or features, prioritizing user access rights and priorities (e.g. by a project leader) including viewing privileges, selecting user-to-user communication channels, initiating communication with another user, and providing access to software tools corresponding to various stages or layers associated with an engineering object. In some embodiments, the user interface module 230 responds to mouse events, keyboard events, and the like.

In some embodiments, the CAx client includes a user-to-user communication module which facilitates direct communication between different users. In some embodiments, the user-to-user communication module leverages one or more of a variety of communication services such as those detailed above. Communication may be between concurrent users as well as users that may not be actively editing an object. The interface elements provided by the user interface may enable a user to select particular users or groups as a target for a particular message or ongoing conversation.

At block 306, the method 300 includes populating the first remote operation to a queue in response to a determination that the first CAx client is executing a local operation. In some embodiments, the queue is local to the first CAx client. In another embodiment, the queue is remote to the first CAx client. In some embodiments, the queue is shared between the first CAx client and one or more other clients, servers, or other elements.

At block 308, the method 300 includes executing the first remote operation on the first CAx client in response to a determination that the first CAx client is idle. In some embodiments, a processor of the first CAx client sends a notification indicating that the first CAx client is idle. In other embodiments, a monitor generates the notification in response to determining that the CAx client is idle.

Figure 4:
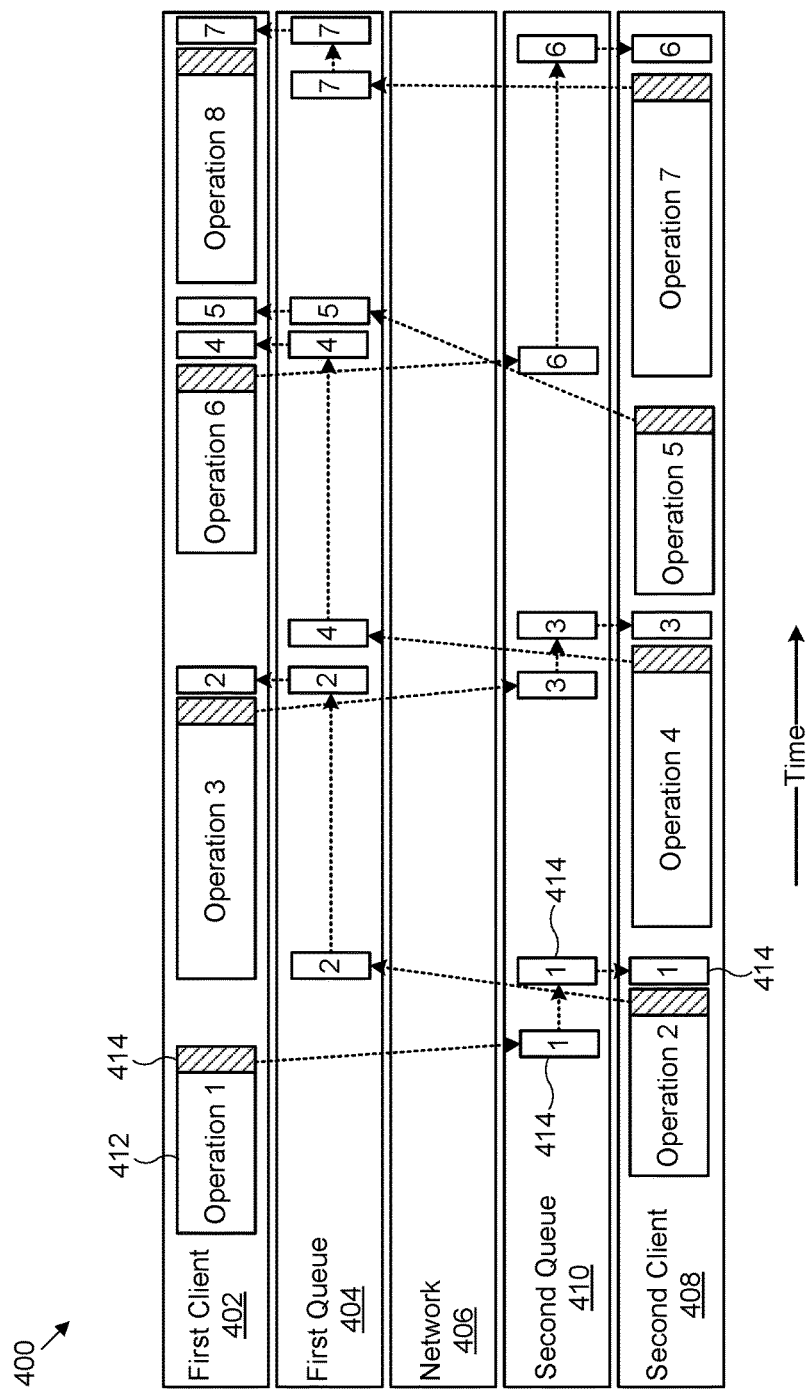
FIG. 4 is an operations diagram of one example of a collaborative CAx editing method that is consistent with one or more embodiments of the claimed invention.

FIG. 4 is an operations diagram 400 of one example of a collaborative CAx editing method that is consistent with one or more embodiments of the claimed invention. In the illustrated embodiment, the diagram 400 shows activity corresponding to a first client 402, a first queue 404 associated with the first client 402, a network 406, a second client 408, and a second queue 410 associated with the second client 408.

In the illustrated embodiment, operations are carried out on each of the first and second clients 402 and 408, respectively. In the illustrated embodiment, the first client 402 carries out an operation, shown as Operation 1. Operation 1 includes an execution portion 412. In the illustrated embodiment, the area corresponding to Operation 1 includes an input portion 412 in which inputs are received and interpreted and a computation portion 414.

In the illustrated embodiment, Operation 1 is completed on the first client 402 and sent across the network 406 to the second client 408. In the illustrated embodiment, the computation portion 414 of Operation 1 arrives during a time corresponding to a user input portion of Operation 2 occurring on the second client 408. In some conventional systems, the computation portion 414 of Operation 1 is executed upon receipt at the second client 408. However, execution of the computation portion 414 of Operation 1 during the user input portion of Operation 2 creates an instance of simultaneous input which can result in poor geometries, conflicts, errors, data corruption, data loss, or other negative effects.

In the illustrated embodiment, in response to a determination that the second client is active with Operation 2, the computation portion 414 of Operation 1 is populated to a second queue 410 associated with the second client 408. In some embodiments, the computation portion 414 of Operation 1 is maintained in the second queue 410 until it is determined that Operation 2 is complete and the second client 408 has become idle. In some embodiments, handling of the computation portion 414 of Operation 1 is then transferred from the second queue 410 to the second client 408 where the computation portion 414 of Operation 1 is performed by the second client 408.

In the illustrated embodiment, Operation 2 is also sent from the second client 408 to the first client 402. Because the first client is determined to be executing Operation 3, Operation 2 is assigned to the first queue 404 until Operation 3 is completed. In this manner, the operations executed at both the first client 402 and the second client 408 are serialized to substantially prevent simultaneous and potentially error-inducing execution of operations.

The illustrated embodiment continues with Operation 3 being transferred to the second client 408 across the network 406 where it is held in the second queue 410. Operation 4 is sent from the second client 408 to the first client 402 where it resides in the first queue 404 awaiting completion of Operation 6.

In the illustrated embodiment, Operation 5 is also completed prior to the completion of Operation 6. In the illustrated embodiment, Operation 4 and Operation 5 are now maintained in a serial arrangement in the first queue 404. In response to a determination that Operation 6 is concluded and the first client 402 is idle, Operation 4 is executed. In response to a determination that Operation 4 is completed and the first client 402 is again idle, Operation 5 is pulled from the first queue 404 and executed on the first client 402.

In the illustrated embodiment, the synchronization of Operation 6 and Operation 7 are also carried out in a similar manner to that described above. While the illustrated example of FIG. 4 relates to a first client 402 and second client 408 in communication, other embodiments include a third client (not shown) in communication with one or more of the first and second clients 402 and 408. Additional clients are also contemplated.

The preceding depiction of the collaborative CAx applications and other inventive elements described herein are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for multi-user CAx editing, the method comprising:
    monitoring an operational state of a processor of a first CAx client;
    receiving, at a communication filter of the first CAx client, a first remote operation to be executed by the first CAx client in a CAx environment;
    populating the first remote operation to a queue formed in a memory structure in response to a determination that the operational state of the processor of the first CAx client is executing a local operation when the first remote operation is received; and
    executing the first remote operation in the CAx environment on the first CAx client in response to a determination that the operational state of the processor of the first CAx client is idle.

2. The method of claim 1, wherein a second remote operation is populated to the queue in serial order behind the first CAx client in response to the determination that the operational state of the processor of the first CAx client is executing the local operation when the second remote operation is received.

3. The method of claim 2, wherein the second remote operation is executed in a serial manner with respect to execution of the first remote operation.

4. The method of claim 1, where in the remote operation is received from a second CAx client in network communication with the first CAx client.

5. The method of claim 1, wherein monitoring the operational state of the processor of the first CAx client comprises performing periodic checks of the operational state of the processor of the first CAx client based on a check schedule.

6. The method of claim 1, wherein monitoring the operational state of the processor of the first CAx client comprises receiving a notification in response to the operational state of the processor changing from executing to idle.

7. The method of claim 1, wherein the memory structure in which the queue is formed is associated with one or more of the first CAx client, a second CAx client, a server, and a remote storage location.

8. A computer program product comprising a computer readable storage medium that is not a transitory signal per se having program instructions embodied therewith, the program instructions readable/executable by a processor to cause the processor to:
    monitor an operational state of a first CAx client;
    receive, at the first CAx client, a first remote operation to be executed by the first CAx client in a CAx environment;
    populate the first remote operation to a queue formed in a memory structure in response to a determination that the operational state of the processor of the first CAx client is executing a local operation when the first remote operation is received; and
    execute the first remote operation in the CAx environment on the first CAx client in response to a determination that the operational state of the processor of the first CAx client is idle.

9. The computer program product of claim 8, wherein a second remote operation is populated to the queue in serial order behind the first CAx client in response to the determination that the operational state of the processor of the first CAx client is executing the local operation when the second remote operation is received.

10. The computer program product of claim 9, wherein the second remote operation is executed in a serial manner with respect to execution of the first remote operation.

11. The computer program product of claim 8, where in the remote operation is received from a second CAx client in network communication with the first CAx client.

12. The computer program product of claim 8, wherein monitoring the operational state of the processor of the first CAx client comprises performing periodic checks of the operational state of the processor of the first CAx client based on a check schedule.

13. The computer program product of claim 8, wherein monitoring the operational state of the processor of the first CAx client comprises receiving a notification in response to the operational state of the processor changing from executing to idle.

14. The computer program product of claim 8, wherein the memory structure in which the queue is formed is associated with one or more of the first CAx client, a second CAx client, a server, and a remote storage location.

15. A computer system comprising:
    a processor on a first CAx client;
    a memory; and
    a computer readable medium having instructions encoded thereon to:
    monitor an operational state of the processor of the first CAx client;
    receive, at the first CAx client, a first remote operation to be executed by the first CAx client in a CAx environment;
    populate the first remote operation to a queue in response to a determination that the operational state of the processor of the first CAx client is executing a local operation when the first remote operation is received; and
    execute the first remote operation in the CAx environment on the first CAx client in response to a determination that the operational state of the processor of the first CAx client is idle.

16. The computer system of claim 15, wherein a second remote operation is populated to the queue in serial order behind the first CAx client in response to the determination that the operational state of the processor of the first CAx client is executing the local operation when the second remote operation is received.

17. The computer system of claim 16, wherein the second remote operation is executed in a serial manner with respect to execution of the first remote operation.

18. The computer system of claim 15, where in the remote operation is received from a second CAx client in network communication with the first CAx client.

19. The computer system of claim 15, wherein monitoring the operational state of the processor of the first CAx client comprises performing periodic checks of the operational state of the processor of the first CAx client based on a check schedule.

20. The computer system of claim 15, wherein the queue is formed is stored to one or more of the first CAx client, a second CAx client, a server, and a remote storage location.

* * * * *